April 19, 1932. I. B. SCOVILL 1,854,384
SPOOL
Filed March 19, 1928
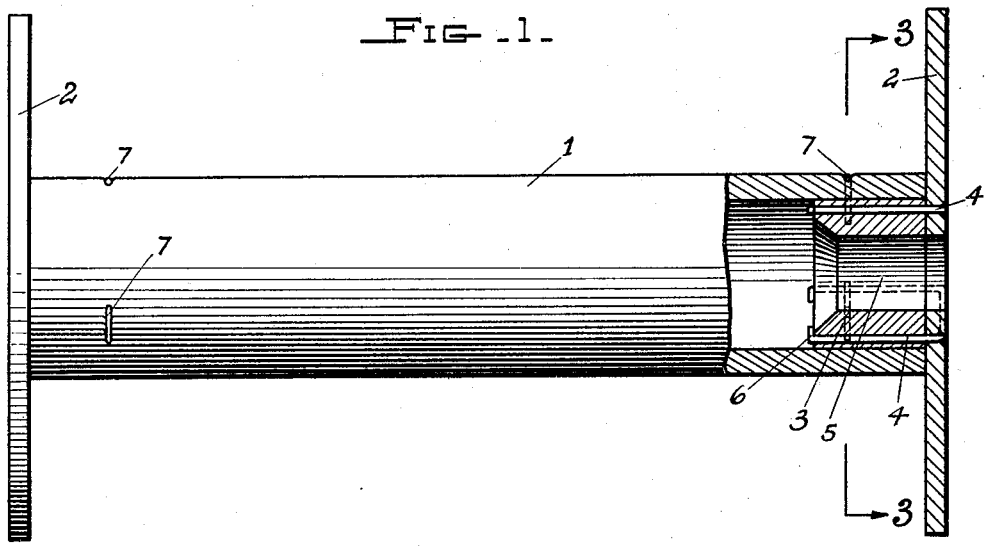
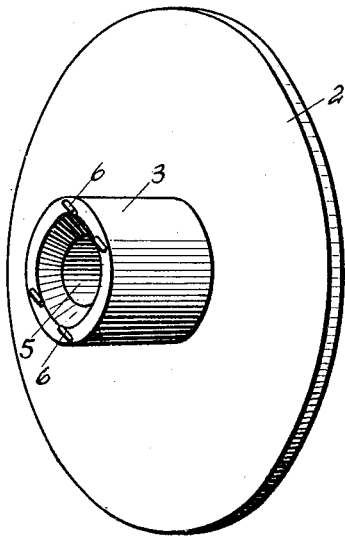
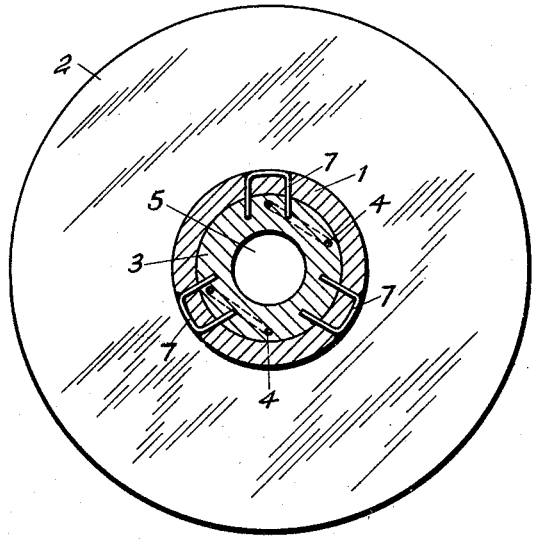
WITNESSES:
Gerhard Baule
Evelyn Crompton
INVENTOR
Ivan B. Scovill,
BY
Joshua R.H. Potts
ATTORNEY Patented Apr. 19, 1932

1,854,384

UNITED STATES PATENT OFFICE

IVAN B. SCOVILL, OF PHILADELPHIA, PENNSYLVANIA, ASSIGNOR TO APEX SPOOL COMPANY, INC., OF PHILADELPHIA, PENNSYLVANIA, A CORPORATION OF PENNSYLVANIA

SPOOL

Application filed March 19, 1928. Serial No. 262,726.

This invention relates to a spool.

The particular type of spool contemplated by this invention is used in wire, textile or other mills for holding wire, tape, etc., during the course of its manufacture, or for winding the product thereon to comprise a saleable unit.

The object of the invention is to produce a spool of better quality than the spools now in general use and one which may be more economically and more speedily manufactured.

A further object of the invention is to produce a spool by fewer operations than the operations now required for producing similar articles.

According to the invention, the spool comprises a tubular member or barrel with flat disks at each end thereof and having sleeves secured thereto by staples passing through said disks and through said sleeves with the ends of the legs of said staples clinched against the inner ends of said sleeves, and having the sleeves secured in the tubular member or barrel by means of nails or staples extending into the sleeve at right angles to said staples which hold the disks and sleeves together.

The drawings illustrate an embodiment of the invention and the views therein are as follows:—

Figure 1 is a side view of the finished spool with a part in longitudinal section, Figure 2 is a perspective view of one of the end disks with a sleeve fastened thereto, Figure 3 is a cross-sectional view on the line 3—3 of Figure 1.

The spool comprises a tubular member or barrel 1 upon which string, cord, wire, ribbon or other lengthy flexible material may be wound and at each end of which an end disk 2 is fastened. To accomplish this end, the end disk is first fastened to a wooden sleeve 3 by pressing staples 4 from the outer face of the disk through the same and through the wooden sleeve parallel to the opening 5 therein and clinching the ends of the staples, as at 6. The end disk and sleeve may have the staples 4 passed through the same and clinched in a single operation.

The unit comprising the end disk and plug fastened thereto is now pushed into the end of the barrel 1 until the disk is flush therewith and then staples 7 are pressed through the walls of said barrel and into the sleeve, as shown in Figure 3, so that the legs of the staples will be at right angles to the legs of the staples indicated by the numeral 4. The fastening of the end disks to the barrel 1 may therefore be accomplished also by a single operation.

I am not unmindful of the patent issued July 24, 1917, No. 1,234,150 to Alois Glaser, nor of Patent No. 1,584,355, granted May 11, 1926, to James Morris Brown. These patents show spools which are intended for the same use as the present invention but the present invention is an improvement thereover both in cost and sturdiness of production.

By making the sleeves of soft wood, fibre, or paper, the staples may be easily pressed or driven through the same and when the disks and sleeves are so attached and the staples clinched on the inner end, the sleeves are practically irremovable from the end disks.

The tubes or barrels 1 may be made of fibrous material or may be made of soft wood and may be of any size and shape desired.

Of course, the spool illustrated may be modified and changed in various ways without departing from the invention herein set forth and hereafter claimed.

The invention is hereby claimed as follows:—

A spool comprising a tube having discs at the end thereof, wooden sleeves secured to the inner faces of the discs and extending into the tube, staples extending transversely through the discs and longitudinally and bodily through the sleeves and clinched against the inner ends of said sleeves, and means for securing said sleeves in position within said tube.

In testimony whereof I have signed my name to this specification.

IVAN B. SCOVILL.